(12) United States Patent
Lehmann et al.

(10) Patent No.: US 10,910,809 B2
(45) Date of Patent: Feb. 2, 2021

(54) ATTENUATION ELEMENT

(71) Applicant: LEONI KABEL GMBH, Roth (DE)

(72) Inventors: Peter Lehmann, Absberg (DE); Philipp Knauer, Lisberg (DE)

(73) Assignee: LEONI KABEL GMBH, Roth (DE)

( * ) Notice: Subject to any disclaimer, the term of this patent is extended or adjusted under 35 U.S.C. 154(b) by 0 days.

(21) Appl. No.: 16/652,505

(22) PCT Filed: Oct. 2, 2018

(86) PCT No.: PCT/EP2018/076806
§ 371 (c)(1),
(2) Date: Jun. 16, 2020

(87) PCT Pub. No.: WO2019/086187
PCT Pub. Date: May 9, 2019

(65) Prior Publication Data
US 2020/0343710 A1 Oct. 29, 2020

(30) Foreign Application Priority Data
Oct. 30, 2017 (DE) .......................... 10 2017 219 417

(51) Int. Cl.
*H02G 15/007* (2006.01)
*H01R 13/58* (2006.01)
(52) U.S. Cl.
CPC .......... *H02G 15/007* (2013.01); *H01R 13/58* (2013.01)
(58) Field of Classification Search
CPC ............................... H02G 15/007; H01R 13/58

USPC ........................................................ 174/70 R
See application file for complete search history.

(56) References Cited

U.S. PATENT DOCUMENTS

| 4,154,049 A | * | 5/1979 | King | G02B 6/4489 385/100 |
| 4,474,426 A | * | 10/1984 | Yataki | G02B 6/4407 385/111 |
| 4,781,434 A | * | 11/1988 | Kitagawa | G02B 6/4407 385/134 |
| 5,030,135 A | | 7/1991 | Plesinger | |
| 5,127,076 A | * | 6/1992 | Lepri | G02B 6/2558 385/104 |
| 6,066,798 A | * | 5/2000 | McAlpine | B29C 48/908 174/23 R |
| 2006/0201698 A1 | | 9/2006 | Mjelstad | |

(Continued)

FOREIGN PATENT DOCUMENTS

| CN | 1102513 A | 5/1995 |
| CN | 106645989 A | 5/2017 |

(Continued)

*Primary Examiner* — Sherman Ng
(74) *Attorney, Agent, or Firm* — Tarolli, Sundheim, Covell & Tummino LLP

(57) ABSTRACT

The invention relates to an attenuation element and to a cable including an attenuation element. The attenuation element includes a resiliently deformable body having a first end and a second end opposite the first end. The body has a length that is defined by the distance between the first end and the second end in a direction parallel to a longitudinal axis of the body. The body has at least one cavity, which extends from the first end to the second end. The at least one cavity is provided in the body in such a way that the length of the at least one cavity is greater than the geometric length.

10 Claims, 9 Drawing Sheets

(56) References Cited

U.S. PATENT DOCUMENTS

2008/0308316 A1    12/2008   Ferragut et al.
2013/0126209 A1     5/2013   Heffner

FOREIGN PATENT DOCUMENTS

| CN | 107039825 A | 8/2017 |
|----|-------------|--------|
| DE | 10118944 | 10/2002 |
| EP | 1691378 A2 | 8/2006 |
| WO | 2014103834 | 7/2014 |

\* cited by examiner a)

b)

ATTENUATION ELEMENT

RELATED APPLICATION

This application filed under 35 U.S.C. § 371 is a national phase application of International Application Serial Number PCT/EP2018/076806 filed Oct. 2, 2018, which claims priority to German Patent Application No. 10 2017 219 417.0, filed on Oct. 30, 2017, the entirely of which are incorporated herein by reference.

TECHNICAL FIELD

The invention relates to an attenuation element, in particular for use in a cable with at least one cable core, and a cable with such an attenuation element.

BACKGROUND

When moving a cable, which is inserted e.g. into a connector housing, the cable movement can be transmitted through cable components such as cable cores, data lines, cable sheaths, conduits etc. in a cable direction/cable conductor direction. In particular, the cable movement can cause loading of the cable components in their axial direction, which loading can be transmitted in the cable direction/cable conductor direction. For example, a bending of the cable can produce tensile or compressive forces in the cable which can be transmitted via the cable cores. The transmission of the cable movement and the loading resulting from the cable movement in the cable direction/cable conductor direction is also termed working through of the cable movement. The load can be transmitted by the working through up to a clamping point or terminal connection of the connector housing and lead to undesirable mechanical loading of this.

During the cable movement the cable components can move and/or twist relative to one another. This movement and/or twisting of the components can be compensated by stranding of the components, in particular of the cable cores and/or the data lines. In other words, such working through of the cable movement can be prevented by laying excess lengths of the cable. This presupposes that adequate space conditions are made available for the additional length of cable. Confined space conditions exist inside a connector housing in particular, making it difficult to lay excess lengths of the cable.

A requirement exists to prevent a cable movement from working through even in confined space conditions.

SUMMARY OF THE INVENTION

According to a first aspect, an attenuation element is proposed, in particular for use in a cable with at least one cable core. The attenuation element has a resiliently deformable body, which has a first end and a second end opposite the first end. The body has a length that is defined by a distance between the first end and the second end in a direction parallel to a longitudinal axis of the body. The body further has at least one cavity, which extends from the first end to the second end. The at least one cavity is provided in the body such that a length of the at least one cavity is greater than the length of the body. In particular, the at least one cavity can be designed/adapted to receive the at least one cable core.

It should be noted that the term "cavity" can comprise an outer cavity and an inner cavity of the body. This means that the cavity can be designed as an outer cavity and/or as an inner cavity. Furthermore, the first end and the second end of the body can describe those points of the body that have the greatest distance from one another in a direction parallel to the longitudinal axis of the body.

Due to the proposed solution, the axial forces caused by pertinent cable movements and acting on the at least one cable core can be transmitted at least partially to the attenuation element. By using the proposed attenuation element in a cable, working though of a cable movement to a clamping point or terminal connection of a connector housing into which the cable can be introduced can at least be reduced if not even prevented. In other words, working through of a cable movement and thus transmission of the axial forces acting on the cable cores to a clamping point or terminal connection of a connector housing are at least reduced or even prevented by the attenuation element. Furthermore, length differences existing between the individual cable components in the cable can be compensated by the use of the attenuation element. The length differences can be caused by production and/or assembly. For example, in production of a multicore cable, individual cable cores can have different lengths. Or during assembly of the cable, for example, the cable cores are initially cut to length, stripped and provided with the clamping point or terminal connection, wherein it can only then be established whether a cable core is too long or too short or does not lie cleanly and/or smoothly due to twisting of the cable. Furthermore, the cable components, in particular the cable sheath, can become longer or shorter due to loading or ageing.

The body of the attenuation element can have a substantially cylindrical form, wherein the first end can correspond to a base area of the body and the second end to the other base area of the body. In this case a diameter, e.g. the outer diameter, of the body can correspond to at least one diameter, e.g. the inner diameter, of the cable in which the attenuation element can be used.

Alternatively the first end can be or comprise a first circular area and the second end a second circular area. A centre point of the first circular area and a centre point of the second circular area can each lie on the longitudinal axis of the body of the attenuation element. The first circular area and the second circular area can further be connected to one another via a shell surface, wherein the shell surface can have a convex form. Convexity is considered in this case in relation to a radial direction of the attenuation element. In other words, the shell surface can have a bulbous form between the first and the second end. A cable sheath conduit of the cable in which the attenuation element can be used can be drawn particularly easily over the attenuation element due to this.

The at least one cavity can be designed as a groove which runs along the shell surface of the body. In this case the at least one cavity is an outer cavity provided on the body of the attenuation element. A particularly simple arrangement of the at least one cable core in the at least one cavity is enabled thereby. Furthermore, the groove can be formed arc-shaped in cross section and have a radius that substantially corresponds to a radius of the at least one cable core. This groove shape makes it possible for the at least one cable core to be placed flush along its outer surface in an inner surface of the groove. In particular, the groove can be designed arc-shaped in cross section so that the at least one cable core can be received in the groove in a form-fitting manner. Depending on the arc angle, the at least one cable core is receivable in the groove particularly easily or in a particularly form-fitting manner.

The at least one cavity can also be formed as a through hole through the body. In other words, the at least one cavity can be provided as an inner cavity in the body of the attenuation element. Furthermore, the through hole can have an inner diameter that is at least as large as the outer diameter of the at least one cable core. If the inner diameter of the through hole and the outer diameter of the at least one cable core are substantially of the same size, the outer surface of the at least one cable core can be receivable/received in a form-fitting manner on an inner surface of the through hole. In other words, the at least one cable core, in particular a section of the at least one cable core received by the through hole, can be receivable in the through hole in such a way that the at least one cable core is immobile in the body of the attenuation element at least in all radial directions with reference to a longitudinal axis, if not even additionally in a longitudinal direction, of the at least one cable core. It is further conceivable that the form fit between the through hole and the at least one cable core has a play, in particular at least in a radial direction, if not even in all radial directions, of the at least one cable core. If the inner diameter of the through hole is larger than the outer diameter of the at least one cable core, the at least one cable core can be guided particularly easily through the attenuation element. Installation of the at least one cable core in the attenuation element is simplified thereby.

The through hole can further approach the longitudinal axis of the body in a cross section of the body perpendicular to its longitudinal axis, in a region of the body in the vicinity of the first end and/or of the second end. The attenuation element can thereby be installed especially well in the cable, as the at least one cable core is receivable by the attenuation element in such a way that the at least one cable core runs along the cable substantially in an axial direction of the cable.

In one embodiment the at least one cavity can run substantially helically about the longitudinal axis of the body. It is conceivable in this case that the at least one cavity does not perform a complete turn. It is also conceivable, however, that the at least one cavity performs one or more turns. An advantage of the helical course of the at least one cavity is that the axial forces occurring in the at least one cable core can be conducted particularly well into the attenuation element.

The at least one cavity in the attenuation element can further be designed as part of a plurality of cavities which each have the same length. The attenuation element can thereby also be installed in a cable with a plurality of cable cores, wherein a number of cavities corresponds to a number of cable cores.

Furthermore, in each cross section of the body perpendicular to its longitudinal axis, the plurality of cavities can be arranged in a circular pattern around the longitudinal axis of the body and spaced uniformly from one another. Due to the particular arrangement of the plurality of cavities, the axial forces acting in the plurality of cable cores are transmissible uniformly to the attenuation element.

The plurality of cavities can further each run offset to one another in an at least approximately similar form. A uniform transmission of the axial forces acting on the plurality of cable cores to the attenuation element is likewise enabled in this case.

The body of the attenuation element can further be formed of a plastic or of a foamed material. Here e.g. elastomers and preferably thermoplastic elastomers are conceivable as possible plastics. The body of the attenuation element can further be formed of a plastic foam or a foamed material.

The at least one cavity can be adapted to receive the at least one cable core in a form-fitting manner. This leads to the axial forces acting in the at least one cable core being able to be conducted particularly favourably into the attenuation element.

According to a second aspect a cable is proposed. The cable has at least one cable core and an attenuation element, as is/has been described herein. Furthermore, the at least one cable core is received in the at least one cavity of the attenuation element.

Furthermore, the at least one cable core can be received, in particular at least substantially, in a form-fitting manner in the at least one cavity. This leads to the axial forces acting in the at least one cable core being able to be conducted particularly favourably into the attenuation element. A form fit between the at least one cable core and the at least one cavity can mean here that the at least one cable core, in particular a section of the at least one cable core received by the at least one cavity, is immobile at least in all radial directions, if not even additionally also in a longitudinal direction, of the at least one cable core. A movement of the at least one cable core can be blocked by an inner surface of the at least one cavity. It is also conceivable that the form fit between the at least one cavity and the at least one cable core has a play, in particular at least in one radial direction, if not even in all radial directions, of the at least one cable core. Alternatively to the form fit between the at least one cable core and the at least one cavity, an adhesive bond, e.g. due to the use of an adhesive, is also conceivable. In other words, the at least one cavity can be designed/adapted to receive the at least one cable core such that the axial forces acting in the at least one cable core are transmissible at least partially, if not even completely, to the attenuation element.

Furthermore, the cable can have a cable sheath, which encloses the at least one cable core and the attenuation element such that the at least one cable core can be fixed by the cable sheath in the at least one cavity. A stable arrangement of the attenuation element in the cable is enabled thereby. It is also conceivable that the cable sheath encloses the attenuation element and the at least one cable core arranged in the at least one cavity in such a way that a frictional connection is created between the at least one cable core and the at least one cavity. It is enabled by the force closure that the axial forces acting in the at least one cable core can be conducted at least partially, if not even completely, into the attenuation element.

Further objectives, features, advantages and application possibilities result from the following description of exemplary embodiments, which are not to be understood as restrictive, with reference to the associated drawings. Here all features described and/or depicted show by themselves or in any combination the subject matter disclosed here, even independently of their grouping in the claims or their references. The dimensions and proportions of the components shown in the figures are not necessarily to scale in this case; they may diverge from what is shown here in embodiments to be implemented.

DETAILED DESCRIPTION

Figure 1:
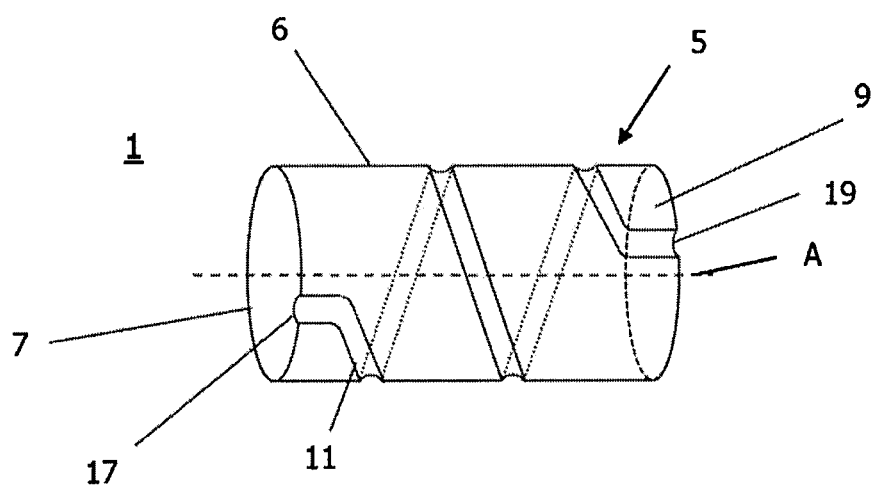
FIG. 1 shows a view in perspective of an attenuation element according to a first variant.

The device variants described here as well as their functional and operating aspects serve purely for a better understanding of their structure, mode of operation and properties; they do not restrict the disclosure to the exemplary embodiments, for instance. The figures are partly schematic, wherein substantial properties and effects are depicted in part significantly enlarged, in order to clarify the functions, active principles, technical configurations and features. Here each mode of operation, each principle, each technical configuration and each feature which is/are disclosed in the figures or in the text can be combined freely and in any way with all claims, each feature in the text and in the other figures, other modes of operation, principles, technical configurations and features that are contained in this disclosure or result from it, so that all conceivable combinations are to be associated with the devices described. Combinations between all individual implementations in the text, meaning in each section of the description, in the claims and also combinations between different variants in the text, in the claims and in the figures are also comprised here and can be made the subject matter of further claims. Nor do the claims limit the disclosure and thus the combination possibilities of all features demonstrated with one another. All disclosed features are disclosed here explicitly also individually and in combination with all other features.

In the figures, components corresponding to one another or similar in function are provided with identical or similar reference characters. The devices and method are now described by means of exemplary embodiments.

FIG. 1 depicts an attenuation element 1 according to a first variant for use in a cable (not shown). The attenuation element 1 has a body 5, which has substantially a cylindrical form and is formed of a resiliently deformable material. This material can be a plastic (e.g. an elastomer and/or thermoplastic elastomer), a foamed material and/or a plastic foam. The body 5 has two base areas, which are arranged parallel to one another and are connected to one another via a shell surface 6. Furthermore, a diameter do of the body 5 substantially corresponds to a diameter of a cable in/with which the attenuation element 1 can be used. The attenuation element 1 can easily be encased due to this by a cable sheath of the cable. In an alternative, the diameter of the body 5 can be larger or smaller than the diameter of the cable.

The body 5 further has a first end 7 and a second end 9. The first end 7 of the body 5 is the base area of the body 5, for example, facing a connector housing. The second end 9 of the body 5 is accordingly the base area of the body 5 facing away from the connector housing, for example. The two base areas, i.e. the first end 7 and the second end 9, of the body 5 are spaced from one another by a length that corresponds to a length $l_0$ of the body 5.

FIG. 1 also shows by way of example an outer cavity 11 designed as a groove, which entwines the body 5 along the shell surface 6 and extends from the first end 7 to the second end 9. The groove 11 has a first groove end 17 and a second groove end 19, which are located on a perimeter of the first end 7 and of the second end 9 of the body 5. Seen in the direction of the longitudinal axis A, the first groove end 17 and the second groove end 19 are twisted counter to one another along a circumferential direction of the shell surface 6 at an acute angle about the longitudinal axis A. An acute angular value should be understood purely as an example and any angle is conceivable in an alternative embodiment. The groove 11 further runs in the vicinity of the first end 7 and the second end 9 substantially parallel to the longitudinal axis A. It is made possible by this that a cable core (not shown) received by the attenuation element 1 can be introduced and brought out parallel to the longitudinal axis A of the body 5 along the attenuation element 1 at the first end 7 and the second end 9. In a section of the body 5 between the first end 7 and the second end 9 the groove 11 runs substantially helically around the body 5 in the direction of the longitudinal axis A. Due to the helical progression of the groove 11, a length of the groove 11 is greater than the length $l_0$ of the body 5. As is to be gathered from FIG. 1, the groove 11 completes a full and a half turn along the attenuation element 1. It would also be conceivable, however, for the groove 11 to run with several turns or with an incomplete turn around the attenuation element.

Figure 2:
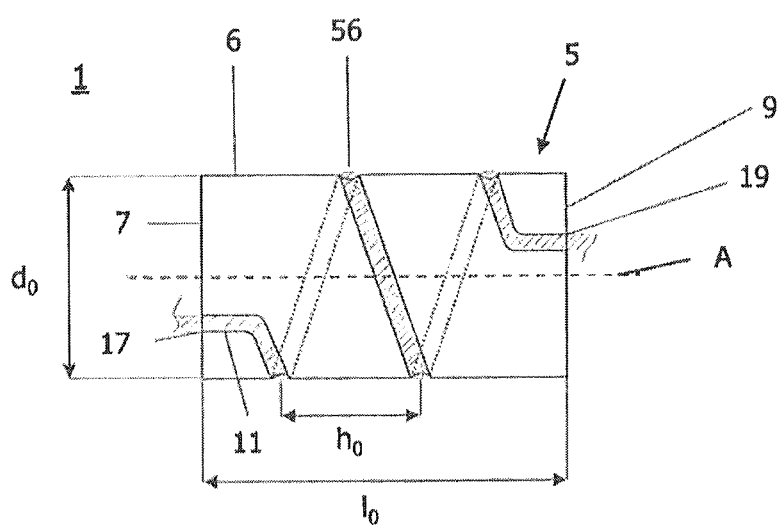
FIG. 2 shows a side view of the attenuation element according to the first variant in an undeformed state.
Figure 8:
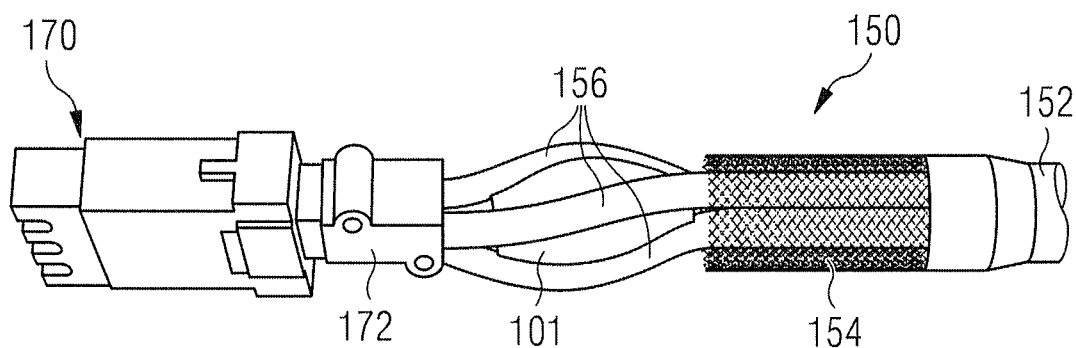
FIG. 8 shows a view in perspective of a cable with the attenuation element according to the third variant.
Figure 8:
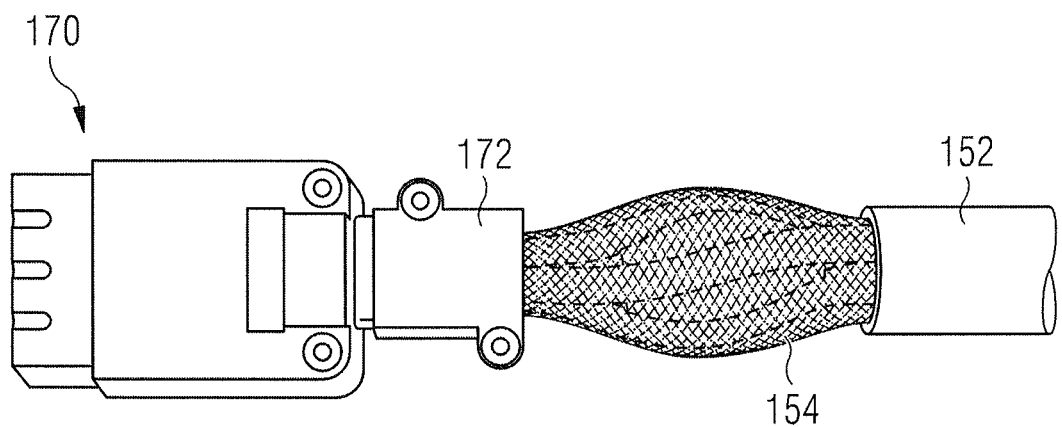

FIG. 2 shows the attenuation element 1 from FIG. 1 with a cable core 56 (of the cable, which is not shown) received in the groove 11. In the arrangement shown here, the groove 11 is designed so that the cable core 56 is receivable in the groove 11 in a form-fitting manner, whereby a force transmission (described later) is made possible between the cable core 56 and the attenuation element 1. In other words, the cable core 56 is led in a form-fitting manner around the attenuation element. In an alternative the groove can be formed arc-shaped in cross section and have a radius that substantially corresponds to an outer radius of the cable core 56. In this alternative the cable core 56 does not have to be received in a form-fitting manner in the groove 11 and the force transmission between the cable core 56 and the attenuation element 1 can be realised by a cable sheath of a cable, as will be described later with reference to FIG. 8b.

It is to be gathered further from FIG. 2 that the cable core 56 is led helically around the attenuation element 1 and thus has a helical section. In the arrangement shown here no force acts on the cable core 56. As long as no force acts on the cable core 56, the attenuation element 1 is in an undeformed state in which the attenuation element 1 has the length $l_0$ and the diameter $d_0$. The helical progression of the groove 11 also has a pitch of $h_0$. The pitch is the distance by which the groove 11 and the cable core 56 turns in a full revolution in the direction of the longitudinal axis A.

Figure 3:
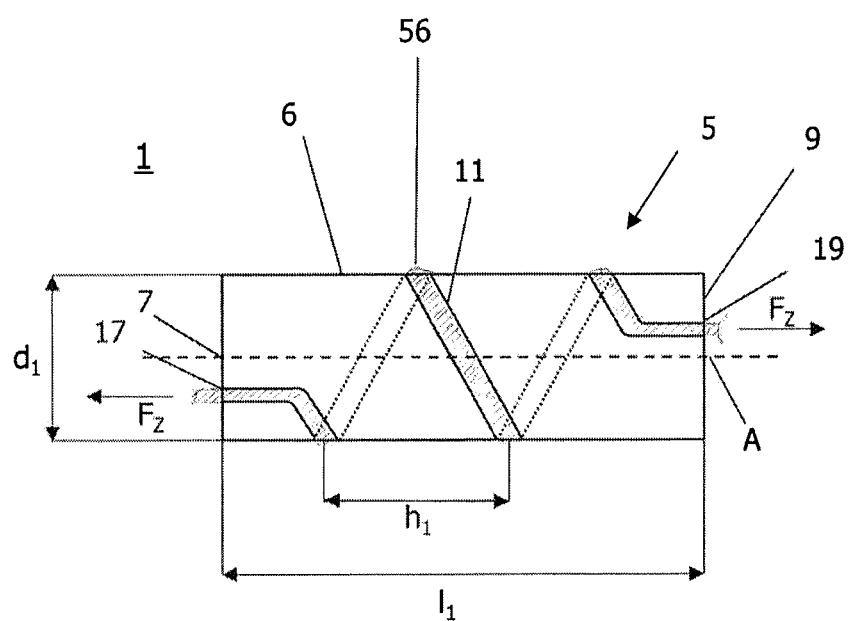
FIG. 3 shows a side view of the attenuation element according to the first variant in an elongated state.

FIG. 3 shows the attenuation element 1 with the cable core 56 received therein, wherein a tensile force $F_z$ acts here on the cable core 56. The tensile force $F_z$ can be caused by a corresponding movement of the cable in which the cable core 56 is provided. The tensile force $F_z$ acts in an axial direction of the cable core 56 and aims at a tightening of the cable core 56 inside the helical section of the cable core 56. In other words, the tensile force $F_z$ causes a reduction in a diameter of the helical section of the cable core 56 while simultaneously increasing its pitch. Since the cable core 56 is received in a form-fitting manner in the groove 11, the tensile force $F_z$ occurring in the cable core 56 is transmitted to the attenuation element 1, which causes a resilient shape change of the body 5. The shape change in this case is an extension of the body 5 in the direction of its longitudinal axis A. The body 5 extends to a length $l_1$, which is greater than the length $l_0$ of the body 5 in an undeformed state, and is reduced to a diameter $d_2$, which is smaller than the diameter $d_0$ of the body 5 in an undeformed state. Due to the extension of the body 5, the pitch of the helical progression of the groove 11 is also increased to $h_1$, wherein the pitch $h_1$ is greater than the pitch $h_0$ of the helical progression of the groove 11 in an undeformed state of the body 5. When the tensile force $F_z$ no longer acts on the cable core 56, the body 5 returns to the undeformed state shown in FIG. 2 again.

In particular, the resilient shape change of the body 5 can be dependent on its shape, on its material and/or on a configuration of the groove 11. It is therefore conceivable that the resilient shape change of the body 5, in particular as a consequence of the tensile force $F_z$ acting in the cable core 56, can comprise an extension in the direction of the longitudinal axis A and/or a taper of a cross section (perpendicular to the longitudinal axis A) of the body 5 and/or a twist about the longitudinal axis A.

Figure 4:
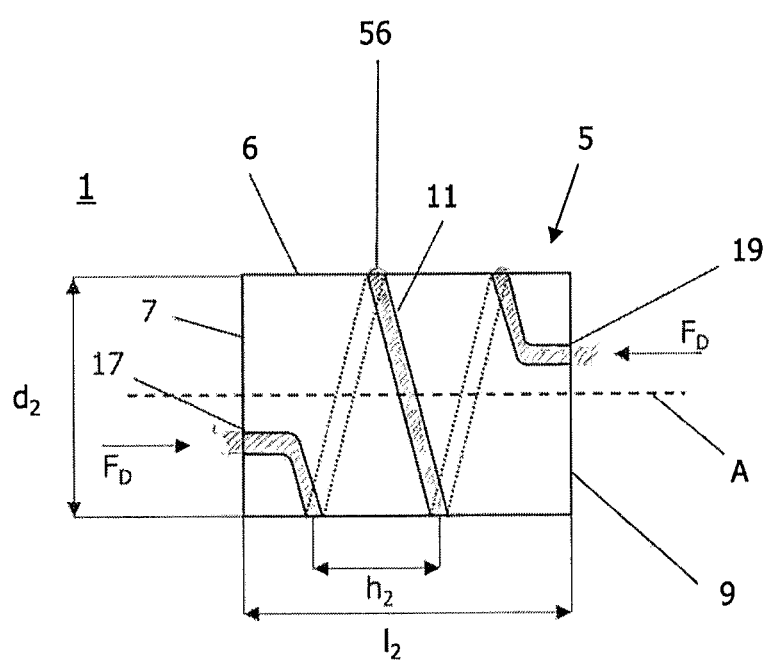
FIG. 4 shows a side view of the attenuation element according to the first variant in a compressed state.

FIG. 4 shows the attenuation element 1 with the cable core 56 received therein, wherein here a compressive force FD acts on the cable core 56. Like the tensile force $F_z$, the compressive force FD can be caused by a corresponding movement of the cable. The compressive force FD acts in an axial direction of the cable core 56 and aims at a compression of the helical section of the cable core 56. In other words, the compressive force FD causes an enlargement of the diameter while at the same time reducing the pitch of the helical section of the cable core 56. Since the cable core 56 is received in a form-fitting manner in the groove 11, the compressive force FD occurring in the cable core 56 is transferred to the attenuation element 1, which causes another resilient shape change of the body 5. As is to be gathered from FIG. 4, compression of the body 5 takes place. Here the body 5 is compressed to a length $l_2$, which is smaller than the length $l_0$ of the body 5 in an undeformed state, and is increased to a diameter $d_1$ which is larger than the diameter $d_0$ of the body 5 in an undeformed state. Due to the compression of the body 5, the pitch of the helical progression of the groove 11 is also reduced to $h_2$, wherein the pitch $h_2$ is smaller than the pitch $h_0$ of the helical progression of the groove 11 in an undeformed state of the body 5. When the compressive force FD no longer acts on the cable core 56, the body 5 returns to the undeformed state shown in FIG. 2 again.

As described above, the resilient shape change of the body 5 can be dependent on its material, on its shape and the configuration of the groove 11. It is accordingly conceivable here also that the resilient shape change of the body 5, in particular as a consequence of the compressive force FD acting in the cable core 56, can comprise a compression in the direction of the longitudinal axis A and/or an expansion of the cross section (perpendicular to the longitudinal axis A) of the body 5 and/or a twist about the longitudinal axis A.

It can be gathered from FIGS. 3 and 4 that the cable core 56 can extend or compress the resiliently deformable body 5 in the event of tensile or compressive loading, wherein a free length of the cable core 56 is adjustable. The free length of the cable core 56 is the part of the cable core 56 that is/will be stripped in order to install the attenuation element 1 in the cable, for example.

Figure 5:
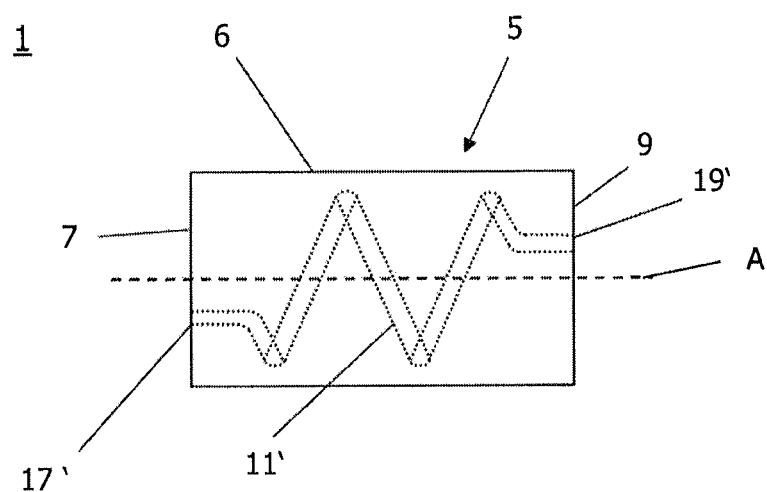
FIG. 5 shows a side view of an attenuation element according to a second variant.

In FIG. 5 a side view of an alternative embodiment of the attenuation element 1 is shown. The arrangement shown here depicts the attenuation element 1 according to FIGS. 1 to 4 with the difference that a cavity is provided no longer as an outer cavity but as an inner cavity in the body 5. The inner cavity is formed as a through hole 11' through the body 5. The through hole 11' has a first hole end 17' and a second hole end 19', which are located in the first end 7 and in the second end 9 of the body. A centre point of the first hole end 17' and a centre point of the second hole end 19' are also at an equal distance radially from the longitudinal axis A. Seen in the direction of the longitudinal axis A, the first hole end 17' and the second hole end 19' are turned counter to one another at an acute angle about the longitudinal axis A along a circumferential direction of the shell surface 6. An acute angle value is not mandatory, however; any angle is conceivable in an alternative embodiment. The through hole 11' further runs substantially parallel to the longitudinal axis A in the vicinity of the first end 7 and the second end 9. In an alternative the first hole end 17' and the second hole end 19' can lie on the longitudinal axis A. In this alternative the attenuation element 1 can be installed particularly well in a cable. As is to be gathered from FIG. 5, the through hole 11' runs in a section of the body 5 between the first end 7 and the second end 9 substantially helically about the longitudinal axis A. Here the through hole 11' completes a full and a half turn along the longitudinal axis A. Here also it is conceivable that the through hole 11' has no complete turn or has one or more turns.

The through hole 11' has an inner diameter, so that the cable core 56 can be led through the through hole 11'. In other words, a section of the cable core 56 can be received in the through hole 11'. Other cross-sectional shapes are also conceivable for the through hole 11' in alternative embodiments. The decisive factor in this case is that the cable core 56 is receivable in the through hole 11'. Since the through hole 11' runs in sections helically about the longitudinal axis A, the cable core 56 is running helically in sections within the attenuation element 1. The configuration of a cavity in the shape of the through hole 11' has the advantage that the cable core 56 does not have to be installed in the through hole 11' in a form-fitting manner, but can be arranged therein even with a play in a radial direction to a longitudinal axis of the through hole 11' in order to transmit a tensile or compressive force acting in the cable core 56 to the attenuation element 1. As described above, tensile or compressive forces acting on the cable core 56 cause a tightening or compression of the cable core 56. If the cable core 56 is arranged with a play in the through hole, the cable core 56 is tightened or compressed inside the attenuation element 1 until the cable core 56 comes into contact in sections with an inner shell surface of the through hole 11'. These contact points in the inner shell surface of the through hole 11' prevent further deformation or length change of the cable core 56, whereby the tensile or compressive force acting on the cable core 56 at these points are transmissible to the attenuation element 1. Resilient deformation of the attenuation element 1 takes place accordingly as described with reference to FIGS. 3 and 4.

Figure 6:
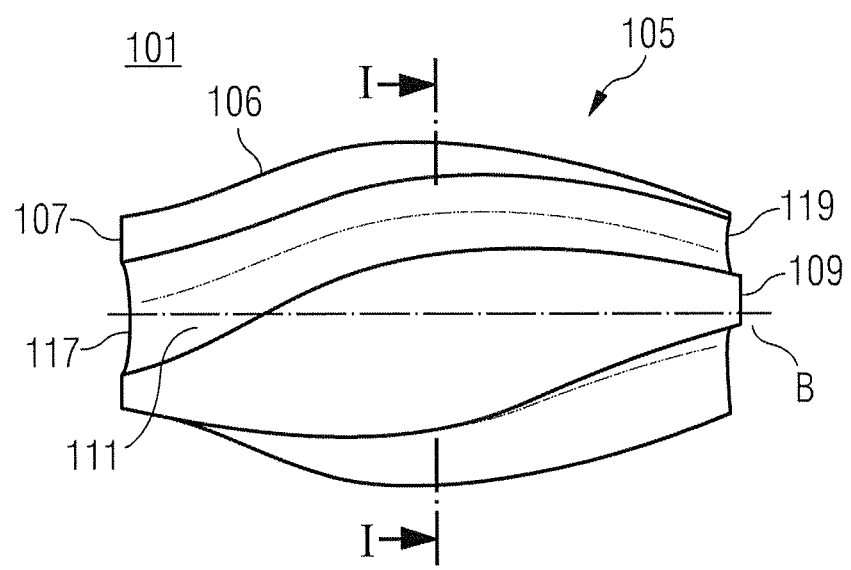
FIG. 6 shows a view in perspective of an attenuation element according to a third variant.

FIG. 6 shows an attenuation element 101 according to a second variant for use in a cable 150 (shown later). In the undeformed state of the attenuation element 101 shown here, the attenuation element 101 has a body 105 that is formed from one of the resiliently deformable materials described above. The body 105 has a first end 117 and a second end 119, which are a first circular area and a second circular area. The first circular area and the second circular area can have a different diameter. In an alternative arrangement the first end 117 and the second end 119 can have a substantially identical diameter. In another alternative the first end 107 and the second end 109 can also be formed as other area shapes, wherein the first end 107 and the second end 109 are areas that have a substantially similar perimeter. In the arrangement shown in FIG. 6, the first end 117 and the second end 119 are arranged parallel to one another, wherein their centre points are located on a common axis, which is also a longitudinal axis B of the body 105. A distance between the first end 107 and the second end 109 along the longitudinal axis B corresponds to a length 1100 of the body 105.

Furthermore, the first end 107 and the second end 109 are connected to one another via a shell surface 106, which has a convex shape. In other words, a cross section of the body 105 increases starting out from the first end 107 and the second end 109 along the longitudinal axis B in the direction of a centre of the body 105, i.e. the body 105 has a bulbous shape between the first 107 and the second end 109. In the centre of the body 105, between the first end 107 and the second end 109 along the longitudinal axis B, the body 105 has a diameter $d_{100}$, which substantially corresponds to a diameter of a cable in which the attenuation element 101 can be used. Due to the similarly large diameter the attenuation element 101 can easily be enclosed by a cable sheath of the cable. In an alternative the diameter of the body 105 can be greater or smaller than the diameter of the cable.

Figure 7:
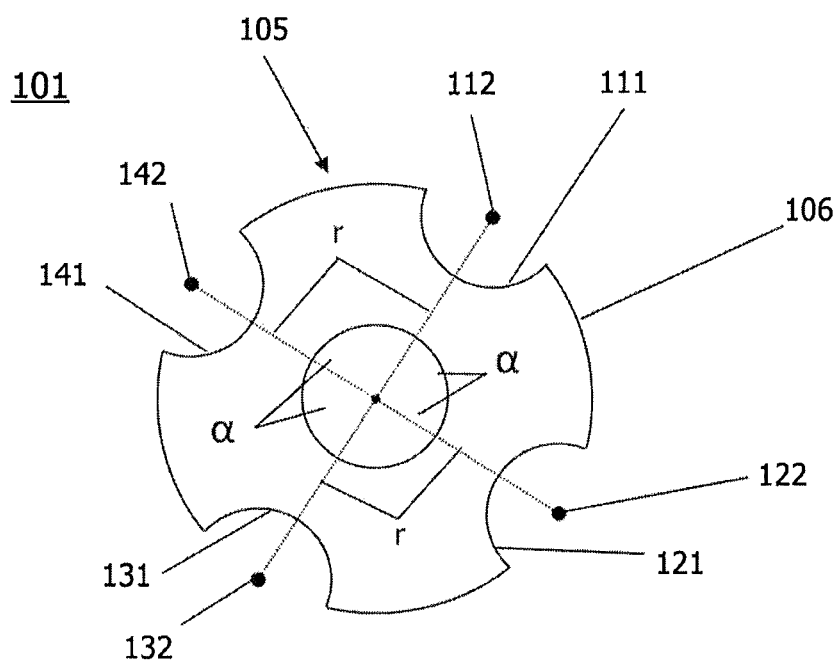
FIG. 7 shows a cross-sectional view of the attenuation element according to the third variant.

FIG. 7 is a cross-sectional view of the attenuation element 101 along a line I-I shown in FIG. 6. It is recognisable from FIGS. 6 and 7 that the body 105 has four grooves (outer cavities) 111, 121, 131, 141, which run around the body 105 along the shell surface 106 and extend from the first end 107 as far as the second end 109. The grooves 111, 121, 131, 141 run around the body 105 such that each groove 111, 121, 131, 141 has an identical length, wherein their length is greater than the length 1100 of the body 105. Furthermore, the grooves 111, 121, 131, 141 run in the vicinity of the first end 107 and the second end 109 substantially parallel to the longitudinal axis B. It is made possible by this that cable cores (not shown) received by the attenuation element 101 can be inserted and led out parallel to the longitudinal axis B of the body 105 along the attenuation element 101 to the first end 107 and the second end 109. The grooves 111, 121, 131, 141 further run substantially parallel to one another.

The groove 111 is described in greater detail below. In FIG. 6 it is shown that the groove 111 has a first groove end 117 and a second groove end 119, which are located on a perimeter of the first end 107 and the second end 109 of the body 105. Seen in the direction of the longitudinal axis B, the first groove end 117 and the second groove end 119 are turned counter to one another approximately at an angle of 90° about the longitudinal axis B along a circumferential direction of the shell surface 106. This angle value is by no means fixed and can be chosen arbitrarily for alternative embodiments. The groove 111 runs from the first groove end 117 to the second groove end 119 without entwining the body 105 here, i.e. the groove 111 does not complete any turn around the body 105. In other words, the groove 111 runs in a section of the body 105 between the first end 107 and the second end 109 substantially diagonally over the shell surface 106 and connects the first groove end 117 to the second groove end 119. The groove 111 thus has a length that is greater than the length 1100 of the body 105. It is further to be gathered from FIG. 7 that the groove 111 is formed arc-shaped in cross section, wherein the cross section of the groove 111 has a radius that substantially corresponds to an outer radius of a cable core, which can be received in the groove 111. In an alternative embodiment the groove 111 can have an arc-shaped cross section so that the cable core is receivable in the groove 111 in a form-fitting manner, whereby the cable core can no longer be moved in a circumferential direction of the shell surface 106.

The configuration of the groove 111 described above also applies to the grooves 121, 131, 141. In other words, the grooves 111, 121, 131, 141 are configured identically but run parallel to one another. Furthermore, the configuration of the groove 111 described here can constitute an alternative configuration for the groove 11 from FIGS. 1 to 4.

With reference to FIG. 7, the arrangement of the grooves 111, 121, 131, 141 in relation to one another is described further in the following. As mentioned above, the grooves 111, 121, 131, 141 run parallel to one another and along the body 105. FIG. 7 shows the cross section of the body 105 perpendicular to its longitudinal axis B, wherein the grooves 111, 121, 131, 141 are arranged in a circular pattern around the longitudinal axis B and spaced uniformly from one another. In other words, the grooves 111, 121, 131, 141 each have an identical spacing r from the longitudinal axis B, i.e. longitudinal axes 112, 122, 132, 142 of the grooves 111, 121, 131, 141 are each spaced from the longitudinal axis B by the distance r. Furthermore, the grooves 111, 121, 131, 141 are each spaced from one another along a circumference of the shell surface 106 by an angle α. In each cross section of the body 105 perpendicular to its longitudinal axis B, the grooves 111, 121, 131, 141 are arranged rotationally symmetrically to one another with reference to the longitudinal axis B, wherein an angle of rotation is selected so that the grooves 111, 121, 131, 141 are distributed uniformly around the circumference of the shell surface 106. It should be noted that the grooves 111, 121, 131, 141 in other cross sections (than shown in FIG. 7) of the attenuation element 101 perpendicular to its longitudinal axis B are spaced at a distance other than distance r from the longitudinal axis B, as the shell surface 106 of the body 105 has the convex shape.

In an alternative embodiment to the arrangement shown in FIGS. 6 and 7, the grooves 111, 121, 131, 141 can each run in the direction of the longitudinal axis B substantially helically around the body 105 as described with reference to FIGS. 1 to 4 for the groove 11. In this alternative embodiment the grooves 111, 121, 131, 141 can also run parallel to one another.

FIG. 8a shows a cable 150 with the attenuation element 101. The cable 150 is inserted into a connector housing 170 and comprises a plurality of cable cores 156, which are led around the attenuation element 101. The cable 150 also has a cable conduit 152 and a cable sheath 154. The grooves 111, 121, 131, 141 each receive one of the cables of the plurality of cable cores 156. A form fit can be realised between the plurality of cable cores 156 and the grooves 111, 121, 131, 141 in that the cable sheath 154 encloses in a form-fitting manner the attenuation element 101 and the plurality of cable cores 156 led along the attenuation element 101, as shown in FIG. 8b. It is to be understood by this that the cable sheath 154 encloses the attenuation element 101 and the plurality of cable cores 156 arranged in the grooves 111, 121, 131, 141 in such a way that a movement of the cables of the plurality of cable cores 156 at least in their radial direction is blocked substantially by the corresponding groove 111, 121, 131, 141 and the cable sheath 154.

Alternatively or in addition to this, the cable sheath 154 can enclose the attenuation element 101 and the plurality of cable cores 156 arranged in the grooves 111, 121, 131, 141 such that a frictional connection is created between the plurality of cable cores 156 and the grooves 111, 121, 131, 141. In other words, the cable sheath 154 can fix the plurality of cable cores 156 in the grooves 111, 121, 131, 141. Alternatively the grooves 111, 121, 131, 141 can be configured so that they receive the plurality of cable cores 156 in a form-fitting manner.

Expressed another way, the plurality of cable cores 156 is received in the various alternatives in the grooves 111, 121, 131, 141 in such a way that a load acting in the plurality of cores 156 can be transmitted to the attenuation element 101.

Tensile and compressive forces that act in an axial direction on each cable core of the plurality of cable cores 156 can be caused by a movement of the cable 150. The plurality of cable cores 156 is led in a form-fitting manner around the attenuation element 101, whereby the tensile and compressive forces occurring in the plurality of cable cores 156 can be transmitted to the attenuation element 101. This in turn leads to a resilient shape change of the attenuation element 101, which is expressed at least in a compression or an extension of the attenuation element 101. Depending on the shape and/or a material of the attenuation element 101 and/or configuration of the grooves 111, 121, 131, 141, the resilient shape change of the attenuation element 101, apart from its extension and its compression, can comprise a taper or an expansion of the cross section of the attenuation element 101 (perpendicular to its longitudinal axis B) and/or a twisting about the longitudinal axis B.

In the following a transmission of a tensile force acting on the plurality of cable cores 156 to the attenuation element 101 is described in greater detail.

As described above, each of the grooves 111, 121, 131, 141 has the same length, which is greater than the length $l_{100}$ of the body 105. Each cable core of the plurality of cable cores 156 is thus arranged inside the attenuation element 101 with an excess length, which corresponds to a difference between the length $l_{100}$ of the body 105 and the length of the individual grooves 111, 121, 131, 141. The tensile force acting in the plurality of cable cores 156 aims to eliminate this excess length, i.e. the tensile force causes a tightening of the plurality of cable cores 156. Since the plurality of cable cores 156 is led in a form-fitting manner around the attenuation element 101, the tensile force causing the tightening is transmitted by the plurality of cable cores 156 to the attenuation element 101. In a section between the first end 107 and the second end 109 of the attenuation element 101, a taper of the cross section of the attenuation element 101 accordingly takes place as well as its extension in the direction of the longitudinal axis B and its turning about the longitudinal axis B. As soon as the plurality of cable cores 156 is no longer loaded by the tensile force, the attenuation element 101 returns again to its undeformed state shown in FIG. 6.

In the following a transmission of a compressive force acting on the plurality of cable cores 156 to the attenuation element 101 is described in greater detail.

Due to the convex shape of the shell surface 106 of the attenuation element 101, the cable cores of the plurality of cable cores 156 likewise run convexly over the attenuation element 101. In other words, the plurality of cable cores 156 has a bulbous progression in a section between the first end 107 and the second end 109 of the attenuation element 101. The compressive force aims for compression of the plurality of cable cores 156, i.e. the plurality of cable cores 156 bulges further. Due to the form fit between the plurality of cable cores 156 and the attenuation element 101, the compressive force causing the compression is transmitted by the plurality of cable cores 156 to the attenuation element 101, whereby a resilient shape change of the attenuation element 101 is caused. In particular, in the section between the first end 107 and the second end 109 of the attenuation element 101, a cross-sectional enlargement takes place as well as a compression of the attenuation element 101 in the direction of the longitudinal axis B and twisting of the attenuation element 101 about the longitudinal axis B. When the compressive force no longer acts on the plurality of cable cores 156, the attenuation element 101 returns to its undeformed state shown in FIG. 6 once again.

Figure 9:
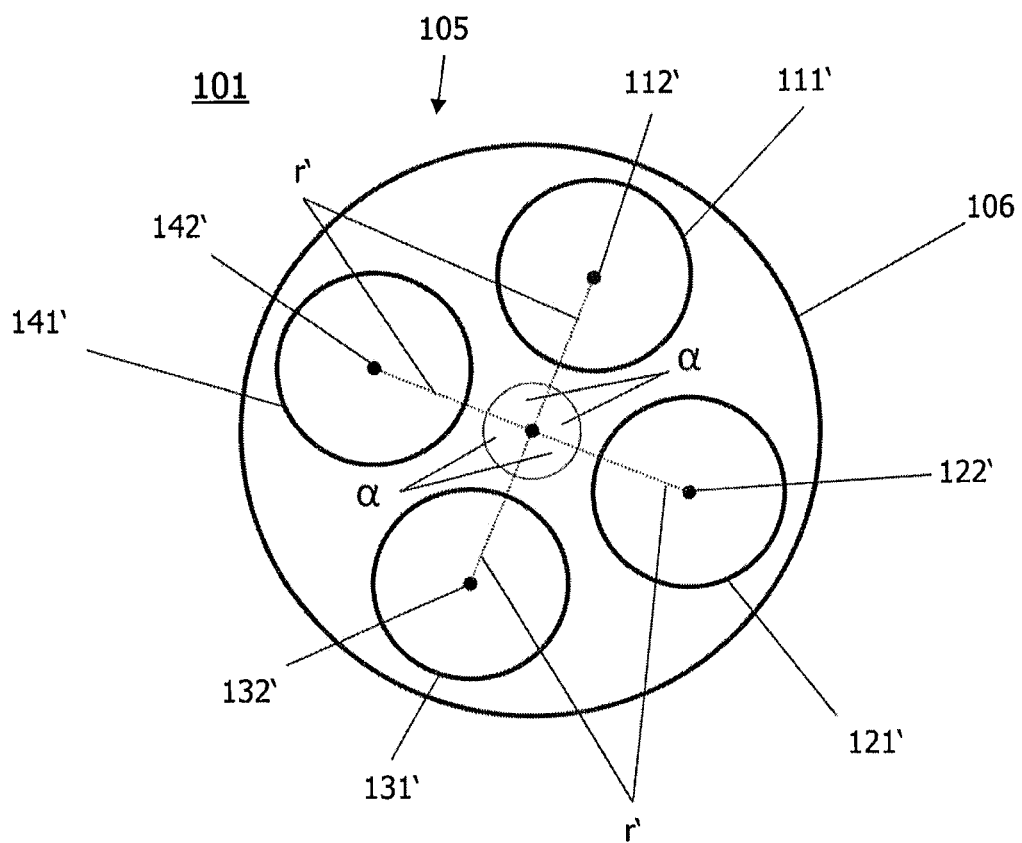
FIG. 9 shows a cross-sectional view of an attenuation element according to a fourth variant.

FIG. 9 shows a cross-sectional view of an alternative embodiment of the attenuation element 101. The arrangement shown here corresponds to the attenuation element 101 shown in FIGS. 6 and 8 with the difference that the cavities do not run in the form of grooves (outer cavities) 111, 121, 131, 141 along the shell surface 106 of the attenuation element 101, but are provided as inner cavities in the form of through holes 111', 121', 131' 141' in the body 105, wherein the through holes 111', 121', 131' 141' have corresponding longitudinal axes 112', 122', 132', 142'. In the cross section shown in FIG. 9 of the attenuation element 101 perpendicular to its longitudinal axis B, the through holes 111', 121', 131' 141' are arranged in a circular pattern around the longitudinal axis B and spaced uniformly from one another. The through holes 111', 121', 131' 141' otherwise correspond to the grooves 111, 121, 131, 141. The arrangement of the grooves 111, 121, 131, 141 in relation to one another described with reference to FIG. 7 applies accordingly to the arrangement of through holes 111', 121', 131' 141' shown in FIG. 9. Furthermore, an inner diameter of the through holes 111', 121', 131' 141' is selected such that the plurality of cable cores 156 can be led through the through holes 111', 121', 131' 141'. The configuration of the cavity described above in the form of the through hole 11' can also apply to the through holes 111', 121', 131' 141' shown in FIG. 9.

The invention claimed is:

1. Attenuation element, which has a resiliently deformable body, wherein the body has:
   a first end and a second end, which lies opposite the first end;
   a length, which is defined by a distance between the first end and the second end in a direction parallel to a longitudinal axis of the body; and
   at least one cavity, which extends from the first end to the second end,
   wherein the at least one cavity is provided in the body such that a length of the at least one cavity is greater than the length of the body,
   wherein the first end is a first circular area and the second end is a second circular area, which are connected to one another via a shell surface, wherein a centre point of the first circular area and a centre point of the second circular area lie on the longitudinal axis of the body, wherein the shell surface between the first end and the second end has a bulbous shape, so that a cross section of the body starting out from the first end and from the second end increases along the longitudinal axis in the direction of a centre of the body.

2. Attenuation element according to claim 1, wherein the at least one cavity is formed as a groove, which runs along a shell surface of the body.

3. Attenuation element according to claim 2, wherein the groove is formed arc-shaped in cross section.

4. Attenuation element according to claim 1, wherein the at least one cavity runs substantially helically about the longitudinal axis of the body.

5. Attenuation element according to claim 1, wherein the at least one cavity is designed as a plurality of cavities, which each have the same length.

6. Attenuation element according to claim 5, wherein in each cross section of the body perpendicular to its longitudinal axis the plurality of cavities are arranged in a circular pattern about the longitudinal axis and spaced uniformly from one another.

7. Attenuation element according to claim 1, wherein the body is formed from an elastomer or a foamed material.

8. Cable, which has:
   at least one cable core; and
   an attenuation element according to claim 1, wherein the at least one cable core is received in the at least one cavity of the attenuation element.

9. Cable according to claim 8, wherein the at least one cable core is received in a form-fitting manner in the at least one cavity.

10. Cable according to claim 8, wherein the cable further has a cable sheath, which encloses the at least one cable core and the attenuation element in such a way that the at least one cable core can be fixed by the cable sheath in the at least one cavity.

\* \* \* \* \*